United States Patent
Tsubouchi et al.

(10) Patent No.: US 6,955,407 B2
(45) Date of Patent: Oct. 18, 2005

(54) NEGATIVE PRESSURE TYPE BRAKE HYDRAULIC PRESSURE GENERATING DEVICE

(75) Inventors: Kaoru Tsubouchi, Asahi-machi (JP); Akihiko Miwa, Asahi-machi (JP); Tomoyasu Sakai, Asahi-machi (JP); Koichi Hashida, Asahi-machi (JP); Haruo Arakawa, Asahi-machi (JP)

(73) Assignee: Advics Co., Ltd., Aichi (JP)

( * ) Notice: Subject to any disclaimer, the term of this patent is extended or adjusted under 35 U.S.C. 154(b) by 0 days.

(21) Appl. No.: 10/701,457

(22) Filed: Nov. 6, 2003

(65) Prior Publication Data

US 2004/0088975 A1 May 13, 2004

(30) Foreign Application Priority Data

Nov. 7, 2002 (JP) ........................................ 2002-323549

(51) Int. Cl.[7] ................................................ B60T 8/44
(52) U.S. Cl. ...................................................... 303/114.1
(58) Field of Search ............................. 91/369.1–369.4, 91/376 R; 60/547, 548, 552, 554, 578; 303/114.1, 114.3, 155; 188/348–358

(56) References Cited

U.S. PATENT DOCUMENTS

| | | | | |
|---|---|---|---|---|
| 4,198,823 A | * | 4/1980 | Mathues et al. | ............ 60/547.3 |
| 4,417,445 A | * | 11/1983 | Furuta | .......................... 60/554 |
| 5,531,509 A | * | 7/1996 | Kellner et al. | ............ 303/114.1 |
| 6,244,049 B1 | * | 6/2001 | Oka et al. | ...................... 60/552 |
| 6,311,492 B1 | * | 11/2001 | Takayama et al. | ............. 60/562 |
| 6,652,040 B2 | | 11/2003 | Oka et al. | |

FOREIGN PATENT DOCUMENTS

JP 2002-173016 A 6/2002

* cited by examiner

Primary Examiner—Chris Schwartz
(74) Attorney, Agent, or Firm—Burns, Doane, Swecker & Mathis LLP

(57) ABSTRACT

A negative pressure type brake hydraulic pressure generating device is proposed in which the stroke on the operating side can be set independently of the stroke on the output side. A slide resistance imparting means is provided between the fixed shell and a piston having a built-in control valve introducing atmospheric air to cancel the slide resistance which is the cause of increased stroke hysteresis of the piston, i.e. the slide resistance applied to the piston at airtight seal portions between the power plate and the piston.

7 Claims, 1 Drawing Sheet

NEGATIVE PRESSURE TYPE BRAKE HYDRAULIC PRESSURE GENERATING DEVICE

BACKGROUND OF THE INVENTION

This invention relates to a negative pressure type brake hydraulic pressure generating device which makes it possible to set a stroke on the operating side independently of a stroke on the output side (affecting the fluid amount consumed in the brake circuit), and particularly to a negative pressure type brake hydraulic pressure generating device which achieves good brake feeling.

A widely used conventional brake hydraulic pressure generating device is structured such that the brake operating force is amplified by means of a booster, and the amplified force is applied to a master cylinder. In this type of device, since the operating stroke of the brake pedal (hereinafter referred to as pedal stroke) directly corresponds to the amount of fluid discharged from the master cylinder, when an additional hydraulic device such as antilock system is activated, its influence inevitably reflects the pedal stroke.

For example, JP patent publication 2002-173016 proposes a brake hydraulic pressure generating device which copes with this problem. In the device, the interior of a fixed shell is partitioned into a constant pressure chamber and a variable pressure chamber by an axially slidable power plate (power piston). Inside the power plate, a piston is provided so as to be axially movable relative to the power plate, biased in the retracting direction by a spring (that is, stroke-power converter) for setting the stroke on the operating side. Also, inside this piston, which has its rear portion protruding outwardly from the fixed shell, a control valve and an input shaft are provided.

The constant pressure chamber is connected to a negative pressure source such as the intake manifold of the engine. Also, the variable pressure chamber communicates with the constant pressure chamber during non-operation of the brakes, and communicates with the atmosphere during operation of the brakes. Communication is changed over by a control valve built in the piston.

When the brake pedal is stepped in, the input shaft, which receives the pedal operating force, is pushed in. With relative movement between the piston and the input shaft at this time, the control valve first shuts off communication between the variable pressure chamber and the constant pressure chamber, and then brings the variable pressure chamber into communication with the atmosphere. Thus, the atmospheric air which depends on the brake operating amount flows into the variable pressure chamber, creating a pressure difference between the constant pressure chamber and the variable pressure chamber. Under this pressure difference, the power plate advances, applying its force to the master cylinder. At this time, the piston, too, advances under the differential pressure between the constant pressure chamber and the variable pressure chamber to a position where the pressure difference balances with the force of the spring. The piston stroke at this time is substantially equal to the stroke of the input shaft. The reaction force upon operation of the pedal is generated when the pressure in the master cylinder is applied to the tip of the input shaft. The pressure in the master cylinder is generated depending on the pressure in the variable pressure chamber.

In the thus structured device of the patent publication, since the power plate and the piston are combined so as to be axially movable relative to each other, it is possible to set the pedal stroke irrespective of the consumed fluid amount of the brakes.

With a brake hydraulic pressure generating device in which a piston having a built-in control valve for introducing atmospheric air and a power plate are combined so as to be axially movable to each other, the sliding resistance by an airtight seal portion provided between the piston and the power plate imparts a bad influence on the movement of the piston. That is, due to this slide resistance, during step-in of the brake pedal, the power plate drags the piston. During return of the brake pedal, the power plate tends to forcibly push back the piston. Thus, the stroke hysteresis of the piston increases, so that the brake feeling worsens.

An object of this invention is to suppress unintended movements of the piston resulting from the slide resistance between the piston and the power plate, thereby improving the brake feeling.

SUMMARY OF THE INVENTION

According to this invention, there is provided a negative pressure type of brake hydraulic pressure generating device comprising, negative pressure type brake hydraulic pressure generating device comprising, a constant pressure chamber connected to a negative pressure source, a variable pressure chamber into which when a brake is operated, atmospheric air of an amount corresponding to the brake operating amount is introduced, a fixed shell for separating the negative pressure chamber and the constant pressure chamber from outside, an input shaft actuated by an operating force applied to a brake operating member, a piston which receives a pressure in the variable pressure chamber and a pressure in the constant pressure chamber on pressure receiving surfaces thereof and produces an advancing thrust by a differential pressure between the pressures, a spring for biasing the piston in a retracting direction, a power plate which receives the pressures in the variable pressure chamber and the constant pressure chamber on pressure receiving surfaces thereof and transmits an advancing thrust under the differential pressure, and a control valve built in the piston for controlling the pressure in the variable pressure chamber by selectively bringing the variable pressure chamber into communication with the atmosphere or the negative pressure source depending on the relative movement-between the input shaft and the piston, the power plate and the piston being axially movable relative to each other, a slide resistance imparting means provided between the piston and the fixed shell to produce a slide resistance between the piston and the fixed shell to cancel a slide resistance between the power plate and the piston.

Here, canceling is ideally completely canceling the slide resistance but may not be complete canceling.

Preferably, the fixed shell has a cylindrical portion provided at a rear end thereof so as to surround a portion of the piston that is exposed to the atmosphere, and the slide resistance imparting means is fixed to the outer periphery of the portion of the piston that is exposed to the atmosphere, thereby producing a slide resistance between the piston and the inner periphery of the cylindrical portion.

Also, preferably, the slide resistance imparting means comprises a slide member and a pressing means for pressing the slide member against a mating slide surface, the slide member being replaceable with another slide member having different pressing properties. The pressing means is not particularly limited, but is preferably an elastic member such as a spring or rubber because it is inexpensive and the installation space can be reduced.

The slide resistance between the piston and the power plate is canceled by the slide resistance imparted by the slide resistance imparting means, so that the stroke hysteresis of the piston decreases. This improves brake feeling.

The slide resistance of an airtight seal portion provided between the fixed shell the piston partially exposed to the atmosphere also serves to cancel the slide resistance between the piston and the power plate. Thus, by setting the slide resistance of the airtight seal portion so as to substantially balance with the slide resistance between the piston and the power plate, too, it is possible to reduce the stroke hysteresis of the piston. But as described above, by providing a cylindrical portion at the rear end of the fixed shell so as to surround the portion of the piston exposed to the atmosphere to produce slide resistance between the inner peripheral surface of the cylindrical portion and the slide resistance imparting means fixed to the outer periphery of the portion of the piston exposed to the atmosphere, assembling and replacement of the slide resistance imparting means are easy. It is also possible to suppress infiltration of foreign matter into the slide portion by fixing the slide resistance imparting means to the outer periphery of the rear end of the portion exposed to the atmosphere.

Further, if the slide resistance imparting means comprises a slide member and a pressing means for pressing the slide member against the mating slide surface, the pressing means can be replaced with one having different properties. This creates freedom of setting of the slide resistance, so that setting can be easily optimized.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
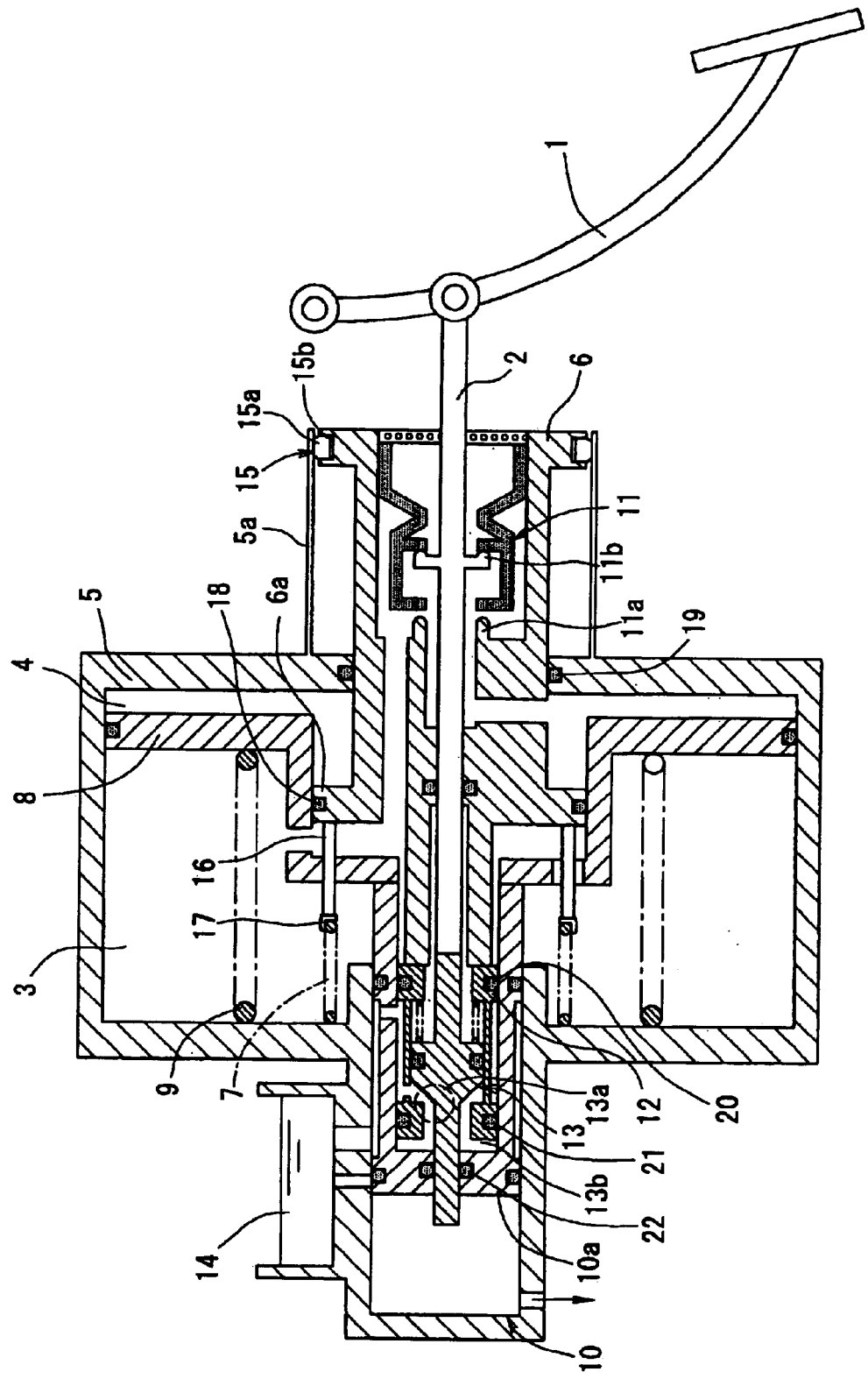
FIG. 1 is a view showing an embodiment of the brake hydraulic pressure generating device of this invention.

The embodiment of this invention will be described with reference to FIG. 1. The negative pressure type brake hydraulic pressure generating device of FIG. 1 is shown with its structure simplified for convenience.

It includes a brake pedal 1, an input shaft 2 that transmits the brake operating force, a constant pressure chamber 3 connected to a negative pressure source such as an intake manifold of an engine, a variable pressure chamber 4 into which an atmospheric air corresponding to the brake operating amount is introduced during operation of the brakes, a fixed shell 5 separating the constant pressure chamber 3 and the variable pressure chamber 4 from outside, a piston 6 that oppositely receives the pressures in the constant pressure chamber and variable pressure chamber on pressure receiving surfaces and produces an advancing thrust under a differential pressure between the pressures, a spring 7 biasing the piston 6 in a retracting direction for setting the stroke on the operating side, a power plate 8 that oppositely receives the pressures in the constant pressure chamber 3 and the variable pressure chamber 4 on its pressure receiving surfaces, a spring 9 biasing the power plate 8 in a retracting direction, a master cylinder 10 connected to wheel brakes (not shown), a control valve 11 built in the piston 6 for introducing atmospheric air, a piston 12 built in a master cylinder piston 10a, a relative movement restricting means 13 for restricting the relative movement between the input shaft 2 and the master cylinder piston 10a, and a reservoir chamber 14, and a slide resistance imparting means 15.

The piston 6 has a large-diameter portion 6a at its tip, which is airtightly and axially slidably mounted on a cylindrical portion of the power plate 8. The piston 6 receives the pressures in the constant pressure chamber 3 and the variable pressure chamber 4 on its pressure receiving surfaces opposite to each other. When a differential pressure between them is produced, thrust is produced, so that the piston 6 advances leftwardly in the figure. On the front surface of the piston 6, a plurality of circumferentially arranged pins 16 are provided which extend through the power plate 8 and protrude into the constant pressure chamber 3. At the tip of each pin 16, a retainer 17 is provided. The spring 7 is disposed between the retainer 17 and the inner wall of the fixed shell 5. The spring 7 may be disposed between the below-described cylindrical portion 5a and the outer periphery of the portion of the piston 6 exposed to the atmosphere.

The relative movement restricting means 13 comprises a valve mechanism 13a having a valve seat formed on the piston 12 and a valve portion formed at the tip of the input shaft 2, and a fluid chamber 13b provided between the piston 12 and the master cylinder piston 10a. The relative movement restricting means 13 fixes the relative position between the input shaft 2 and the master cylinder piston 10a when the capacity of the device reaches or approaches the assisting limit, i.e. when the pressure difference between the variable pressure chamber 4 and the atmosphere (outside of the fixed shell 5) disappears or fall below a predetermined value, thereby preventing the brake pedal from being pushed in without increase in the reaction force when the driver increases the brake pedal stepping force thereafter. Also, it serves to reflect the increase of the pedal stepping force after the assisting limit on the master cylinder pressure. The relative movement restricting means 13 is a preferable element but is not essential.

The slide resistance imparting means 15 is mounted in an annular groove formed in the outer periphery of the rear end of the piston 6, which protrudes outwardly from the fixed shell 5. The slide resistance imparting means 15 comprises a slide member 15a, and an elastic member 15b such as a leaf spring or a rubber ring mounted in the bottom of the annular groove. The elastic member 15b may be replaced with one having different properties.

The fixed shell 5 has at its rear portion a cylindrical portion 5a surrounding the portion of the piston 6 exposed to the atmosphere and concentric with the piston 6. The slide member 15a is pressed against the inner peripheral surface of the cylindrical portion 5a to produce slide resistance between the fixed shell 5 and the piston 6.

To the piston 6, slide resistance is applied by airtight seal portions 18, 20, 21 and 22 provided between the piston 6 and the power plate 8. The slide resistance by the airtight seal portions 18, 20, 21 and 22 increases the stroke hysteresis of the piston 6. The slide resistance by an airtight seal portion 19 provided between the piston 6 and the fixed shell 5 acts in such a direction as to cancel the slide resistance by the airtight seal portions 18, 20, 21 and 22, but is not sufficient to cancel it. In order to make up for this shortage, the slide resistance by the slide resistance imparting means 15 is imparted. Thus, dragging force applied from the power plate 8 to the piston 6 when the brake pedal 1 is stepped in, and the pushback force applied from the power plate 8 to the piston 6 when the brake pedal 1 is returned are canceled, so that the movement of the piston 6 stabilizes.

With the illustrated brake hydraulic pressure generating device, the reaction force to the operation of the brake pedal 1 is imparted by the hydraulic pressure generated in the master cylinder 10.

With the thus structured device, during non-operation in which the brake pedal 1 is not stepped in, the control valve 11 shuts off the variable pressure chamber 4 from the atmosphere, and keeps the variable pressure chamber 4 in communication with the constant pressure chamber 3. Thus, the pressure in the variable pressure chamber 4 is equal to the pressure in the constant pressure chamber 3, so that the power plate 8, which receives the pressures in both chambers on the pressure receiving surfaces, does not move but stops at the illustrated position.

When the brake pedal 1 is stepped in and the input shaft 2 is pushed leftwardly in FIG. 1, the control valve 11 shuts off the variable pressure chamber 4 from the constant pressure chamber 3. During non-braking, the control valve 11 is pulled by the input shaft 2 and compressed, but when the input shaft 2 advances, it is elastically restored and expands.

Thus, until the tip of the control valve 11 touches a valve seat 11a formed on the piston 6, the contact with a valve seat 11b formed on the input shaft 2 is maintained. Thus the variable pressure chamber 4 is first shut off from the constant pressure chamber 3. Thereafter, the control valve 11 separates from the valve seat 11b, so that the variable pressure chamber 4 communicates with the atmosphere. Now atmospheric air is introduced into the variable pressure chamber 4, so that the pressure in the variable pressure chamber will rise. Thus, a pressure difference is produced between the constant pressure chamber 3 and the variable pressure chamber 4. Under the pressure difference, the power plate 8 advances, so that the force amplified by the power plate 8 is applied to the master cylinder. Thus, a hydraulic pressure corresponding to the brake operating amount is produced in the master cylinder 10. The power plate 8 will advance to a position where the thrust produced by the differential pressure balances with the reaction force from the master cylinder.

Under the pressure difference produced between the constant pressure chamber 3 and the variable pressure chamber 4, an advancing thrust is imparted to the piston 6, too, so that the piston 6 also advances to a position where the thrust balances with the reaction force from the spring 7. Since the piston 6 follows the input shaft 2 so that when the movement of the input shaft 2 stops, the control valve 11 will be in such a position as to shut off the variable pressure chamber 4 from both the constant pressure chamber 3 and the atmosphere, the stroke of the piston 6 at this time is substantially equal to the stroke of the input shaft 2.

Also, with the illustrated device, when the brake pedal 1 is stepped in hard, so that the pressure in the variable pressure chamber 4 reaches the assisting limit, the movement of the piston 6 will stop at a position where the variable pressure chamber 4 is under the atmospheric pressure. Thus the state in which through the control valve 11, the variable pressure chamber 4 communicates with the atmosphere is maintained.

In this state, if the brake pedal is stepped in with additional force, relative movement develops between the input shafts 2 and the piston 12, so that the valve mechanism 13a will close, thus stopping the flow of fluid from the fluid chamber 13b to the reservoir 14. Thus, the relative position between the input shaft 2 and the master cylinder piston 10a is fixed, so that the brake pedal 1 is prevented from being pushed in without increase in the reaction force. Further, the force due to the additional pedal step-in is transmitted to the master cylinder piston 10a through the fluid sealed in the fluid chamber 13b, so that the increase in the stepping force after the assisting limit is reflected on the master cylinder pressure.

As described above, the brake hydraulic pressure generating device of this invention is provided with a slide resistance imparting means between the piston having a built-in control valve for introducing atmospheric air and the fixed shell so that by the slide resistance by the slide resistance imparting means, the slide resistance between the piston and the power plate is canceled. This optimizes stroke hysteresis during step-in and return of the brake pedel, so that the brake feeling improves.

What is claimed is:

1. A negative pressure brake hydraulic pressure generating device comprising, a constant pressure chamber connected to a negative pressure source, a variable pressure chamber into which when a brake is operated, atmospheric air of an amount corresponding to the brake operating amount is introduced, a fixed shell for separating said negative pressure chamber and said constant pressure chamber from outside, an input shaft actuated by an operating force applied to a brake operating member, a piston which receives a pressure in said variable pressure chamber and a pressure in said constant pressure chamber on pressure receiving surfaces thereof and produces an advancing thrust by a differential pressure between said pressures, a spring for biasing said piston in a retracting direction, a power plate which receives said pressures in said variable pressure chamber and said constant pressure chamber on pressure receiving surfaces thereof and transmits an advancing thrust under said differential pressure, a control valve built in said piston for controlling the pressure in said variable pressure chamber by selectively bringing said variable pressure chamber into communication with the atmosphere or said negative pressure source depending on the relative movement between said input shaft and said piston, said power plate and said piston being axially movable relative to each other, and a slide resistance imparting arrangement provided between said piston and said fixed shell, said slide resistance imparting arrangement producing a slide resistance between said piston and said fixed shell that is sufficient to cancel a slide resistance produced between said power plate and said piston.

2. A negative pressure brake hydraulic pressure generating device as claimed in claim 1 wherein said fixed shell has a cylindrical portion provided at a rear end thereof so as to surround a portion of said piston that is exposed to the atmosphere, and wherein said slide resistance imparting arrangement is fixed to the outer periphery of said portion of said piston that is exposed to the atmosphere, whereby producing a slide resistance between said piston and the inner periphery of said cylindrical portion.

3. A negative pressure brake hydraulic pressure generating device as claimed in claim 2 wherein that said slide resistance imparting arrangement is fixed to the outer periphery of the rear end of the portion of said piston that is exposed to the atmosphere.

4. A negative pressure brake hydraulic pressure generating device as claimed in claim 1 wherein said slide resistance imparting arrangement comprises a slide member and a pressing means for pressing said slide member against a mating slide surface, said slide member being replaceable with another slide member having different pressing properties.

5. A negative pressure brake hydraulic pressure generating device as claimed in claim 4 wherein an elastic member is used as said pressing means.

6. A negative pressure brake hydraulic pressure generating device as claimed in claim 2 wherein said slide resistance imparting arrangement comprises a slide member and a pressing means for pressing said slide member against a mating slide surface, said slide member being replaceable with another slide member having different pressing properties.

7. A negative pressure brake hydraulic pressure generating device as claimed in claim 3 wherein said slide resistance imparting arrangement comprises a slide member and a pressing means for pressing said slide member against a mating slide surface, said slide member being replaceable with another slide member having different pressing properties.

* * * * *